United States Patent
Fukami

(10) Patent No.: US 8,911,214 B2
(45) Date of Patent: Dec. 16, 2014

(54) WIND TURBINE BLADE, WIND TURBINE GENERATOR INCLUDING WIND TURBINE BLADE, AND METHOD FOR DESIGNING WIND TURBINE BLADE

(75) Inventor: Koji Fukami, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 49 days.

(21) Appl. No.: 13/879,721

(22) PCT Filed: Oct. 13, 2011

(86) PCT No.: PCT/JP2011/073566
§ 371 (c)(1),
(2), (4) Date: Jul. 1, 2013

(87) PCT Pub. No.: WO2012/053424
PCT Pub. Date: Apr. 26, 2012

(65) Prior Publication Data
US 2013/0272890 A1    Oct. 17, 2013

(30) Foreign Application Priority Data
Oct. 22, 2010   (JP) ................. 2010-238041

(51) Int. Cl.
*F03D 1/06*   (2006.01)
*F01D 5/14*   (2006.01)

(52) U.S. Cl.
CPC ............. *F01D 5/14* (2013.01); *F05B 2240/301* (2013.01); *F03D 1/0641* (2013.01); *Y02E 10/721* (2013.01); *Y02E 10/722* (2013.01); *Y10S 416/02* (2013.01)
USPC .................................. 416/223 R; 416/DIG. 2

(58) Field of Classification Search
CPC ... Y02E 10/721; Y02E 10/722; F03D 1/0641; F01D 5/14; F01D 5/141; F01D 5/148; F01D 5/145; F05B 2240/301; F05B 2250/00; F05B 2250/02; F05B 2250/10; F05B 2250/14; F05B 2250/141; F05B 2250/16; F05B 2250/17; F05B 2250/70; F05B 2250/71; F05D 2240/301; F05D 2250/00; F05D 2250/02; F05D 2250/10; F05D 2250/14; F05D 2250/141; F05D 2250/16; F05D 2250/17; F05D 2250/70; F05D 2250/71
USPC ............ 416/223 R, 242, 243, DIG. 2, DIG. 5
See application file for complete search history.

(56) References Cited

U.S. PATENT DOCUMENTS 4,976,587 A * 12/1990 Johnston et al. ............... 416/230
5,474,425 A * 12/1995 Lawlor ....................... 416/223 R
(Continued)

FOREIGN PATENT DOCUMENTS

| CN | 1659376 A | 8/2005 |
| DE | 102006017897 A1 | 10/2007 |

(Continued)

OTHER PUBLICATIONS

Decision to Grant a Patent issued Jan. 14, 2014, corresponds Japanese patent application No. 2010-238041.

(Continued)

*Primary Examiner* — Richard Edgar
*Assistant Examiner* — Joshua R Beebe
(74) *Attorney, Agent, or Firm* — Manabu Kanesaka; Benjamin J. Hauptman

(57) ABSTRACT

When a distance from a front edge along a blade chord line is represented by X and a distance from the blade chord line to a blade back side is represented by Y, a blade back shape of a wind turbine blade includes a first region extending from the maximum blade thickness position toward the rear edge with dY/dX as a primary derivative amount of Y to X decreasing by a first amount of change, a second region on a side of the rear edge of the first region and extending toward the rear edge with dY/dX having a second amount of change smaller than the first amount of change, and a third region on the side of the rear edge of the second region and connected to the rear edge with dY/dX decreasing by a third amount of change larger than the second amount of change.

10 Claims, 8 Drawing Sheets

(56) References Cited

U.S. PATENT DOCUMENTS

| | | | |
|---|---|---|---|
| 6,705,838 B1 * | 3/2004 | Bak et al. | 416/243 |
| 2007/0036657 A1 * | 2/2007 | Wobben | 416/223 R |
| 2009/0202354 A1 * | 8/2009 | Godsk et al. | 416/223 R |
| 2009/0317227 A1 * | 12/2009 | Grover et al. | 415/1 |
| 2010/0154781 A1 | 6/2010 | Zhang et al. | |

FOREIGN PATENT DOCUMENTS

| | | | |
|---|---|---|---|
| DE | 102008003411 A1 | 7/2008 | |
| EP | 0675285 A1 | 10/1995 | |
| EP | 1152148 A1 | 11/2001 | |
| GB | 2265672 A | 10/1993 | |
| JP | 3935804 B2 | 6/2007 | |
| JP | 2009-293622 A | 12/2009 | |
| WO | 0114740 A1 | 3/2001 | |

OTHER PUBLICATIONS

International Search Report corresponding to PCT/JP2011/073566, dated Jan. 17, 2012.

Extended European Search Report issued May 30, 2014, corresponds to European patent application No. 11834264.1.

Office Action issued Jul. 15, 2014, corresponding to Chinese patent application No. 201180050612.6.

* cited by examiner

WIND TURBINE BLADE, WIND TURBINE GENERATOR INCLUDING WIND TURBINE BLADE, AND METHOD FOR DESIGNING WIND TURBINE BLADE

RELATED APPLICATIONS

The present application a National Phase of International Application Number PCT/JP2011/073566, filed Oct. 13, 2011, and claims priority from Japanese Application Number 2010-238041, filed Oct. 22, 2010.

TECHNICAL FIELD

The present invention relates to a wind turbine blade, a wind turbine generator including the wind turbine blade, and a method for designing the wind turbine blade.

BACKGROUND ART

In recent years, power generation using a wind turbine has been developed as clean energy. Blades of the wind turbine rotate around a shaft with wind energy; torque of the blades is converted into electric power to obtain generation output power.

The generation output power of the wind turbine is equal to a product of shaft-end output power (output power generated by the blade) and conversion efficiency (efficiency of a bearing or a generator). Further, the shaft-end output power is expressed by the following expression; a blade having high blade efficiency and a large blade diameter increases power generation.

$$\text{Shaft-end output power} = 1/2 \times \text{air density} \times \text{wind speed}^3 \times \text{blade efficiency} \times \pi \times (\text{blade diameter}/2)^2$$

The blade efficiency has a theoretical upper limit (Betz limit=0.593), and an actual upper limit is about 0.5 due to an influence of a wake and air resistance of the blade. Thus, it is difficult to make further significant increase in the blade efficiency.

Meanwhile, since the square of the blade diameter influences output power, it is effective to enlarge the blade diameter to increase power generation. However, enlargement of the blade diameter increases aerodynamic load (a thrust force applied in an inflow direction and moment transferred to a blade root), which may increase sizes or weights of devices such as a rotor head, a nacelle, and a tower, and thus increase cost. Thus, a technique is needed to increase a length of a blade while preventing an increase in aerodynamic load of the blade. As an aerodynamically (in terms of a blade shape) conceivable method to avoid an increase in load, there is a method of reducing a chord length (blade chord length) (specifically, increasing an aspect ratio or reducing solidity) to reduce a blade projection area and reduce aerodynamic load.

The aspect ratio and the solidity are expressed by the following expression.

$$\text{Aspect ratio} = \text{blade length}^2/\text{blade projection area} \quad (1)$$

$$\text{Solidity} = \text{entire blade projection area/blade sweep area} = (\text{the number of blades} \times \text{average chord length})/(n \times (\text{blade diameter}/2)^2) \quad (2)$$

Generally, a wind turbine blade has a predetermined optimum chord length for a predetermined tip speed ratio, and has a relationship in the following expression (Wind Energy Handbook, John Wiley & Sons, p378).

$$Copt/R \times \lambda^2 \times \lambda^2 CLdesign \times r/R \approx 16/9 \times \pi/n \quad (3)$$

where Copt is an optimum chord length, R (blade radius) is ½ of the blade diameter, λ is a design tip speed ratio, CLdesign is design lift coefficient, r is a radial position of a blade section, and n is the number of blades.

The design tip speed ratio is blade tip peripheral speed/infinite upstream wind speed. The design lift coefficient is a lift coefficient at an angle of attack where a lift-drag ratio (lift/drag) of a blade profile (blade section) is maximum, and determined by an (aerodynamic) shape of the blade profile (blade section) and an inflow condition (Reynolds number).

FIG. 8 shows definition of the Reynolds number used herein. As shown in FIG. 8, the Reynolds number of the wind turbine considers a relative wind speed on a predetermined section A-A of a blade rotated at a predetermined number of revolutions, and expressed by the following expression.

Reynolds number=air density×relative wind speed on blade section×chord length of blade section/viscosity coefficient of air PTL 1 mentioned below discloses a blade profile for increasing output power of a wind turbine. Specifically, a blade profile is disclosed in which a blade thickness ratio is within a range of 14% to 45% and a design lift coefficient is within a range of 1.10 to 1.25. (See claim 1.)

CITATION LIST

Patent Literature

{PTL 1}
EP Patent Application, Publication No. 1152148

SUMMARY OF INVENTION

Technical Problem

However, even if a desired design lift coefficient can be determined to increase output power of a wind turbine as in PTL 1, a surrounding environment of the wind turbine is adversely affected without simultaneous consideration of aerodynamic noise of a wind turbine blade.

The present invention is achieved in view of such circumstances, and has an object to provide a wind turbine blade that can reduce aerodynamic noise, a wind turbine generator including the wind turbine blade, and a method for designing the wind turbine blade.

Solution to Problem

To achieve the above described object, a wind turbine blade, a wind turbine generator including the wind turbine blade, and a method for designing the wind turbine blade according to the present invention adopt the following solutions.

Specifically, a first aspect of the present invention provides a wind turbine blade in which a blade back shape from a maximum blade thickness position toward a rear edge is defined so that when a distance from a front edge along a blade chord line is represented by X and a distance from the blade chord line to a blade back side is represented by Y, the blade back shape includes a first region that extends from the maximum blade thickness position toward the rear edge on the blade back side with dY/dX as a primary derivative amount of the Y to the X decreasing by a first amount of change, a second region that is located on a side of the rear edge of the first region and extends toward the rear edge with the dY/dX having a second amount of change smaller than the first amount of change, and a third region that is located on the side of the rear edge of the second region and is connected to the rear edge with the dY/dX decreasing by a third amount of change larger than the second amount of change.

A main factor of aerodynamic noise of a wind turbine blade is a vortex in a boundary layer discharged from a turbulence boundary layer developing from the maximum blade thickness position toward the rear edge on the blade back side. Thus, reducing a thickness of the turbulence boundary layer developing from the maximum blade thickness position toward the rear edge on the blade back side can reduce aerodynamic noise.

Thus, in the present invention, dY/dX as the primary derivative amount of Y (distance from the blade chord line to the blade back side) to X (distance from the front edge along the blade chord line) has been considered. Then, the blade back shape from the maximum blade thickness position toward the rear edge is defined to include the first region that extends from the maximum blade thickness position toward the rear edge with dY/dX decreasing by the first amount of change, the second region that is located on the side of the rear edge of the first region and extends toward the rear edge with dY/dX having the second amount of change smaller than the first amount of change, and the third region that is located on the side of the rear edge of the second region and is connected to the rear edge with dY/dX decreasing by the third amount of change larger than the second amount of change. Specifically, with X on the abscissa and dY/dX on the ordinate, dY/dX changes so that the first region, the second region, and the third region draw a curve of a substantially S shape.

The second region has a smaller amount of change of dY/dX than the first region and the third region, and thus in the second region, a reduction ratio of a blade surface flow velocity can be reduced to prevent development of the turbulence boundary layer. This can provide a wind turbine blade with reduced aerodynamic noise.

The second region is preferably defined so that the amount of change of dY/dX is substantially zero (dY/dX is substantially constant) to reduce the reduction ratio of the blade surface flow velocity.

Preferably, a design tip speed ratio (blade tip peripheral speed/inflow wind speed) is 6 or more (more preferably 8.0 to 9.0), and Reynolds number is three millions to ten millions.

In the wind turbine blade according to the first aspect of the present invention, it is preferable that when the X is divided by a chord length and normalized with the X in a front edge being 0% and the X in a rear edge being 100%, the maximum blade thickness position is provided within a range of the X of 29% to 31%.

In the wind turbine blade according to the first aspect of the present invention, it is preferable that when the X is divided by a chord length and normalized with the X in the front edge being 0% and the X in the rear edge being 100%, a maximum camber position is provided within a range of the X of 50% to 65%.

Further, in the wind turbine blade according to the first aspect of the present invention, it is preferable that the wind turbine blade further includes a blade body that extends radially from a blade root toward a blade tip and has a maximum blade thickness changing in each radial position, and a blade shape in a section of the blade body in each radial position has the dY/dX increased and decreased depending on an increase and a decrease in the maximum blade thickness in each section.

Since the blade shape is determined by increasing or decreasing dY/dX depending on the increase and the decrease in the maximum blade thickness, a blade shape with low aerodynamic noise can be easily designed.

Further, in the wind turbine blade according to the first aspect of the present invention, it is preferable that the wind turbine blade further includes a blade body that extends radially from a blade root toward a blade tip and has a maximum blade thickness position changing in each radial position, and a blade shape in a section of the blade body in each radial position has the X changed depending on a change in the maximum blade thickness position in each section.

Since the blade shape is determined by changing X depending on the change in the maximum blade thickness position, a blade shape with low aerodynamic noise can be easily designed.

Further, in the wind turbine blade according to the first aspect of the present invention, it is preferable that, with a chord length being C in a blade section, X/C, Y/C, and the dY/dX are defined as in Table 1,

TABLE 1

| X/C | Y/C | dY/dX |
| --- | --- | --- |
| 0.3000 | 0.1157 | |
| 0.3500 | 0.1149 | −0.05300 |
| 0.4000 | 0.1111 | −0.10420 |
| 0.4500 | 0.1051 | −0.14060 |
| 0.5000 | 0.0976 | −0.16200 |
| 0.5500 | 0.0892 | −0.17410 |
| 0.6000 | 0.0803 | −0.18150 |
| 0.6500 | 0.0712 | −0.18580 |
| 0.7000 | 0.0618 | −0.18840 |
| 0.7500 | 0.0523 | −0.19110 |
| 0.8000 | 0.0427 | −0.19530 |
| 0.8500 | 0.0328 | −0.20100 |
| 0.9000 | 0.0226 | −0.20850 |
| 0.9500 | 0.0120 | −0.21830 |
| 1.0000 | 0.0007 | | and the wind turbine blade has a blade shape within an error range of ±3% of each numerical value of the Y/C.

A second aspect of the present invention provides a wind turbine generator including: the above described wind turbine blade; a rotor that is connected to a side of a blade root of the wind turbine blade and rotated by the wind turbine blade; and a generator that converts torque obtained by the rotor into electrical output power.

A third aspect of the present invention provides a method for designing a wind turbine blade including: defining a blade back shape from a maximum blade thickness position toward a rear edge so that when a distance from a front edge along a blade chord line is represented by X and a distance from the blade chord line to a blade back side is represented by Y, the blade back shape includes a first region that extends from the maximum blade thickness position toward the rear edge on the blade back side with dY/dX as a primary derivative amount of the Y to the X decreasing by a first amount of change, a second region that is located on a side of the rear edge of the first region and extends toward the rear edge with the dY/dX having a second amount of change smaller than the first amount of change, and a third region that is located on the side of the rear edge of the second region and is connected to the rear edge with the dY/dX decreasing by a third amount of change larger than the second amount of change.

A main factor of aerodynamic noise of a wind turbine blade is a vortex in a boundary layer discharged from a turbulence boundary layer developing from the maximum blade thickness position toward the rear edge on the blade back side. Thus, reducing a thickness of the turbulence boundary layer developing from the maximum blade thickness position toward the rear edge on the blade back side can reduce aerodynamic noise.

Thus, in the present invention, dY/dX as the primary derivative amount of Y (distance from the blade chord line to the blade back side) to X (distance from the front edge along the blade chord line) has been considered. Then, the blade back shape from the maximum blade thickness position toward the rear edge is defined to include the first region that extends from the maximum blade thickness position toward the rear edge with dY/dX decreasing by the first amount of change, the second region that is located on the side of the rear edge of the first region and extends toward the rear edge with dY/dX having the second amount of change smaller than the first amount of change, and the third region that is located on the side of the rear edge of the second region and is connected to the rear edge with dY/dX decreasing by the third amount of change larger than the second amount of change. Specifically, with X on the abscissa and dY/dX on the ordinate, dY/dX changes so that the first region, the second region, and the third region draw a curve of a substantially S shape.

The second region has a smaller amount of change of dY/dX than the first region and the third region, and thus in the second region, a reduction ratio of a blade surface flow velocity can be reduced to prevent development of the turbulence boundary layer. This can provide a wind turbine blade with reduced aerodynamic noise.

The second region is preferably defined so that the amount of change of dY/dX is substantially zero (dY/dX is substantially constant) to reduce the reduction ratio of the blade surface flow velocity.

Preferably, a design tip speed ratio (blade tip peripheral speed/inflow wind speed) is 6 or more (more preferably 8.0 to 9.0), and Reynolds number is three millions to ten millions.

The method for designing a wind turbine blade according to the third aspect of the present invention preferably includes: a reference blade shape determination step of determining a reference blade shape as a reference by the method for designing a wind turbine blade described above; and a second blade shape determination step of determining, when determining a second blade shape having a maximum blade thickness different from a maximum blade thickness of the reference blade shape determined by the reference blade shape determination step, the second blade shape by increasing or decreasing the dY/dX depending on an increase and a decrease in the maximum blade thickness with respect to the maximum blade thickness of the reference blade shape.

Since the blade shape is determined by increasing or decreasing dY/dX depending on the increase and the decrease in the maximum blade thickness, a blade shape with low aerodynamic noise can be easily designed.

Also, the method for designing a wind turbine blade according to the third aspect of the present invention preferably includes: a reference blade shape determination step of determining a reference blade shape as a reference by the method for designing a wind turbine blade described above; and a third blade shape determination step of determining, when determining a third blade shape having a maximum blade thickness position different from a maximum blade thickness position of the reference blade shape determined by the reference blade shape determination step, the third blade shape by changing the X depending on a change in the maximum blade thickness position with respect to the maximum blade thickness position of the reference blade shape.

Since the blade shape is determined by changing X depending on the change in the maximum blade thickness position, a blade shape with low aerodynamic noise can be easily designed.

Advantageous Effects of Invention

According to the present invention, a thickness of a turbulence boundary layer developing from a maximum blade thickness position toward a rear edge on a blade back side can be reduced to reduce aerodynamic noise.

DESCRIPTION OF EMBODIMENTS

Now, an embodiment according to the present invention will be described with reference to the drawings.

A wind turbine blade according to this embodiment is favorably used for a power generation wind turbine. For example, three wind turbine blades are provided and connected to a rotor at about 120° intervals. Preferably, the wind turbine blade is an elongated blade having a rotation diameter (blade diameter) of 60 m or more and solidity of 0.2 to 0.6. A design tip speed ratio (blade tip peripheral speed/inflow wind speed) is 6 or more (more preferably 8.0 to 9.0) and Reynolds number is three millions to ten millions. The wind turbine blades may be variable pitch blades or fixed pitch blades.

Figure 1:
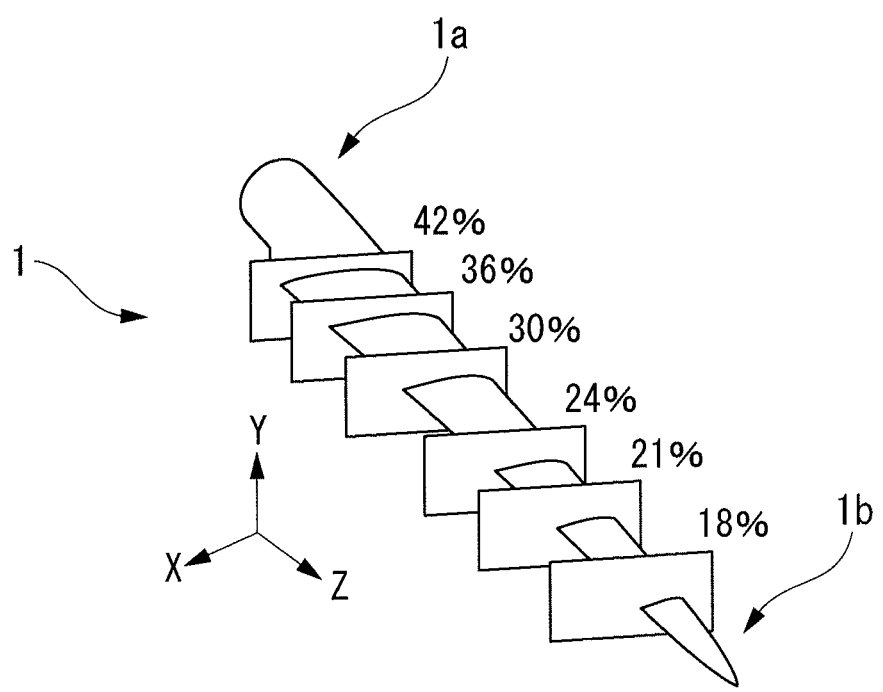
FIG. 1 is a perspective view showing a typical shape of a wind turbine blade.

As shown in FIG. 1, the wind turbine blade 1 is a three-dimensional blade, and extends from a blade root 1a on a side of a rotation center toward a blade tip 1b.

As shown in FIG. 1, a blade shape is defined using blade element sections cut in radial positions at blade thickness ratios (percentages of a maximum blade thickness value divided by a chord length) in a fixed Z direction (a longitudinal axis direction of the blade). In FIG. 1, blade element sections cut in radial positions at blade thickness ratios of 18%, 21%, 24%, 30%, 36%, and 42% are used for defining the shape of the wind turbine blade. For indicating the radial positions of the wind turbine blade 1, a radial position r corresponding to a distance from a rotation center of the blade is sometimes used instead of the blade thickness ratio (or a dimensionless radial position r/R of a radial position divided by a blade radius).

Figure 2:
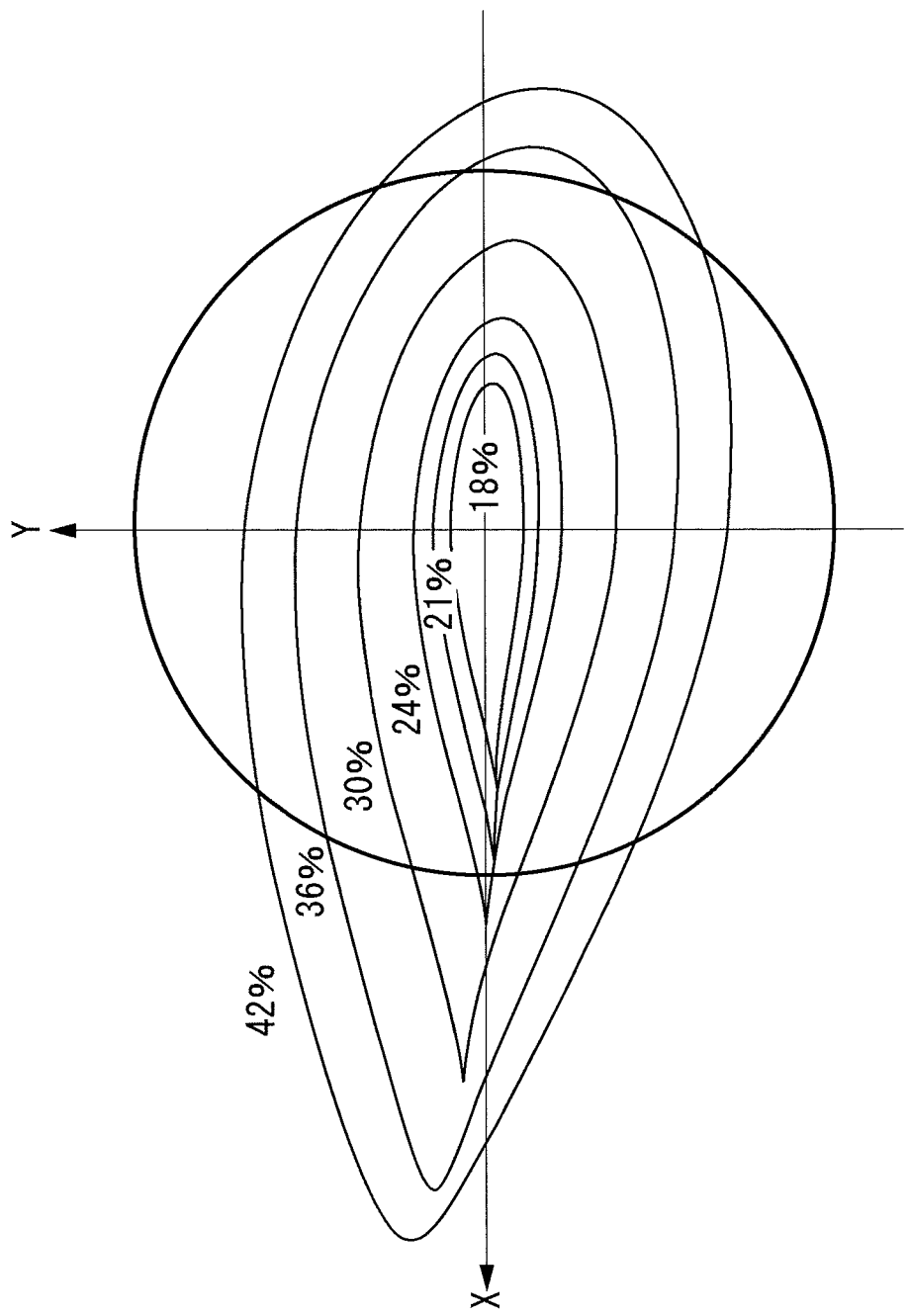
FIG. 2 shows sections at blade thickness ratios in FIG. 1.

FIG. 2 shows the blade element sections in FIG. 1 being projected on an XY plane (plane perpendicular to a Z axis). As shown in FIG. 2, a right side is a blade front edge when seen from a longitudinal tip of the wind turbine blade 1.

Figure 3:
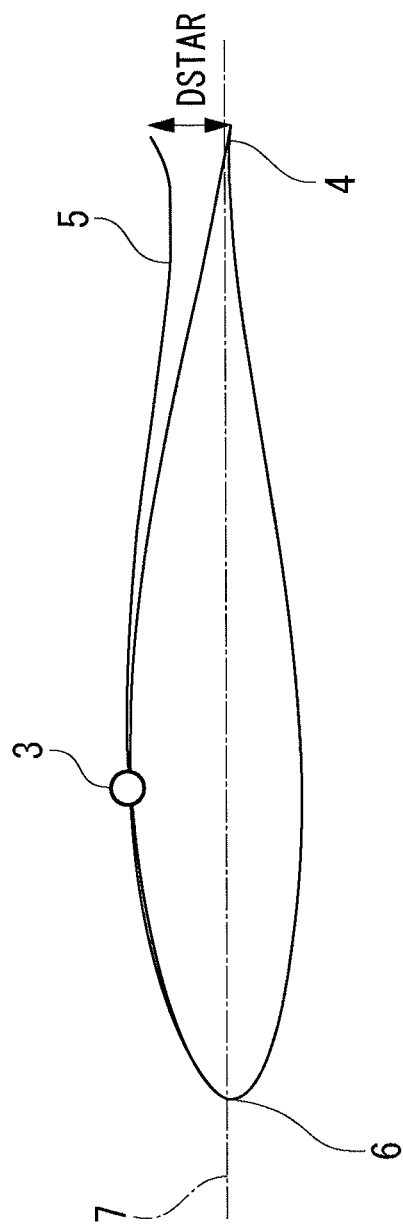
FIG. 3 illustrates a turbulence boundary layer as a main factor of aerodynamic noise.

FIG. 3 shows a blade profile according to this embodiment. The blade profile is normalized by dividing the blade element section at each blade thickness ratio of the wind turbine blade 1 by a chord length C as a length on a blade chord line 7 extending from a front edge 6 to a rear edge 4. Specifically, the blade profile is normalized with the front edge being X/C=0, Y/C=0 and the rear edge being X/C=1, Y/C=0.

As shown in FIG. 3, a turbulence boundary layer 5 develops from a maximum blade thickness position 3 toward the rear edge 4 on a back side. A vortex in a boundary layer discharged from the turbulence boundary layer 5 causes aerodynamic noise. Thus, reducing a turbulence boundary layer thickness DSTAR at the rear edge 4 can reduce aerodynamic noise.

A maximum blade thickness position in the blade profile of this embodiment is set within a range of a position X/C in a blade chord direction of 0.29 (29%) to 0.31 (31%). A maximum camber position is set within a range of a position X/C in the blade chord direction of 0.5 (50%) to 0.65 (65%).

Figure 4:
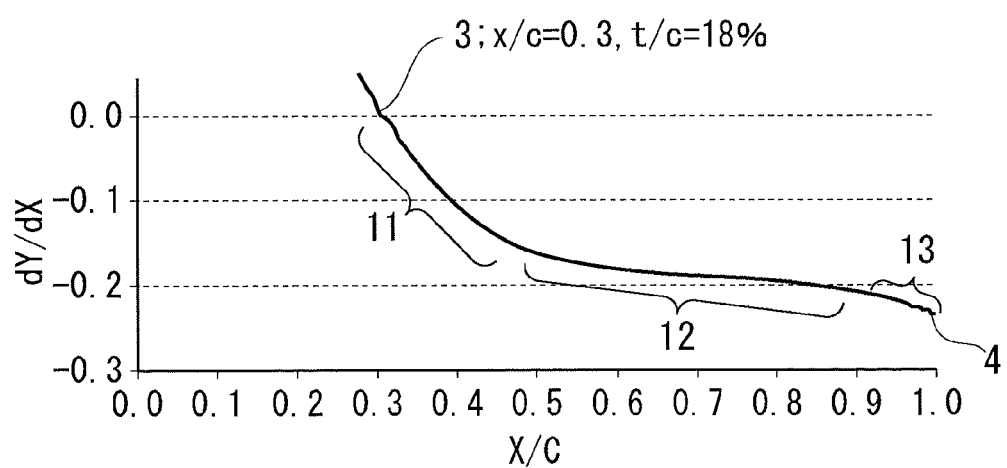
FIG. 4 shows a way of defining a back shape of a wind turbine blade according to an embodiment of the present invention.

FIG. 4 shows a way of defining a shape from the maximum blade thickness position 3 toward the rear edge 4 on the back side of the blade profile in FIG. 3. FIG. 4 shows a blade profile with a blade thickness ratio t/C of 0.18 (18%). The position X/C in the blade chord direction normalized by the chord length C is represented on the abscissa, and dY/dX as primary derivative of a distance Y from the blade chord line 7 to the back side with respect to the distance X from the front edge is represented on the ordinate. In FIG. 4, the position X/C in the blade chord direction of the maximum blade thickness position is 0.3(30%).

As shown in FIG. 4, there are provided a first region 11 that extends from the maximum blade thickness position 3 toward the rear edge 4 with dY/dX decreasing by a first amount of change, a second region 12 that is located on a side of the rear edge 4 of the first region 11 and extends toward the rear edge 4 with dY/dX having a second amount of change smaller than the first amount of change, and a third region 13 that is located on the side of the rear edge 4 of the second region 12 and is connected to the rear edge 4 with dY/dX decreasing by a third amount of change larger than the second amount of change.

Specifically, dY/dX changes so that the first region 11, the second region 12, and the third region 13 draw a curve of a substantially S shape.

The second region 12 is preferably defined so that the amount of change of dY/dX is substantially zero (dY/dX is substantially constant). This can reduce a reduction ratio of a blade surface flow velocity as described later.

Figure 5:
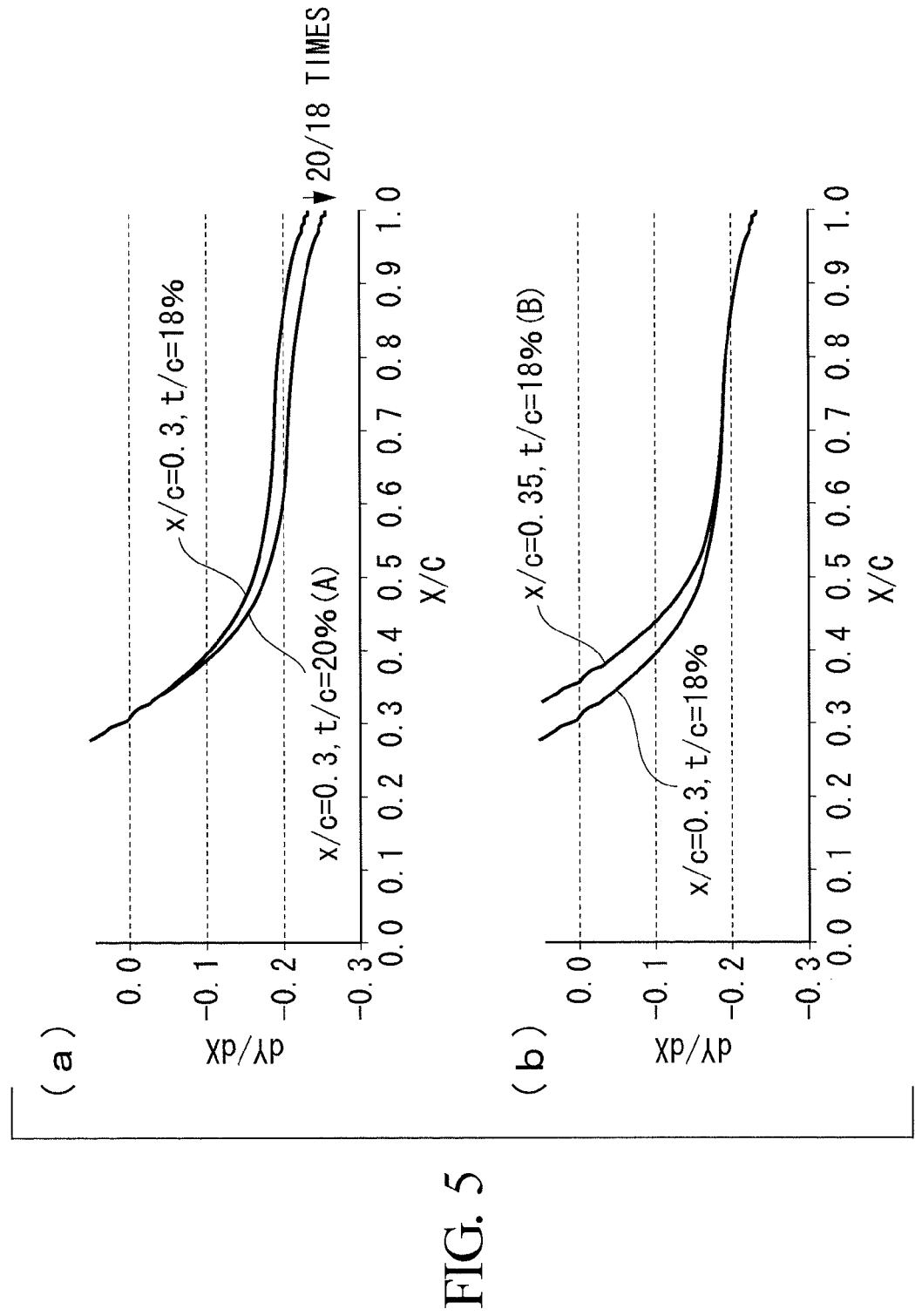
FIG. 5 shows a dY/dX curve in FIG. 4 being changed.

FIG. 5 shows a way of providing dY/dX when a maximum blade thickness (blade thickness ratio) of the blade profile in FIG. 4 having a blade thickness ratio of 18% is changed (FIG. 5(a)), and when a maximum blade thickness position of the blade profile is changed (FIG. 5(b)).

When the maximum blade thickness (blade thickness ratio) is changed, an absolute value of dY/dX is increased and decreased depending on an increase and a decrease in the blade thickness ratio. In the case shown in FIG. 5(a), the blade thickness ratio increases from 18% to 20%, and thus the absolute value of dY/dX is increased by 20/18 times. In FIG. 5(a), the blade thickness ratio of 20% is located below the blade thickness ratio of 18% because dY/dX on the ordinate is represented by a negative value.

When the maximum blade thickness position is changed, a distance X/C from the front edge is increased and decreased (changed) in an X direction depending on a change in the maximum blade thickness position. In the case shown in FIG. 5(b), the maximum blade thickness position is changed from X/C=0.3 to X/C=0.35, and thus the distance X/C from the front edge is increased in the X direction. In this case, the distance is preferably increased so as to keep a range of the second region substantially horizontal.

Next, with reference to FIG. 6, a design concept of the blade profile in FIG. 4 will be described.

(1) Design Flexibility

The region from the maximum blade thickness position 3 to the rear edge 4 on the back side of the wind turbine blade shown in FIG. 3 has design flexibility based on the following conditions.

(i) dY/dX=0 is satisfied in the maximum blade thickness position 3.

(ii) A rear edge angle (angle formed between a blade back surface and a blade front surface at the rear edge 4) of a predetermined value or more is required at the rear edge 4 in terms of ensuring blade strength. Thus, dY/dX at the rear edge 4 needs to be a negative value having an absolute value equal to or larger than the predetermined value.

(iii) For a blade profile having a predetermined camber, an integral ($\int$(dY/dX)dX) of the curve dY/dX with respect to a region from the maximum blade thickness position 3 to the rear edge 4 on the blade back side, that is, an area of a region between dY/dX and the X axis needs to be equal between before (broken line in FIG. 7) and after (solid line in FIG. 7) optimization of the back shape as in this embodiment.

As long as the conditions (i) to (iii) above are satisfied, the way of connection between the maximum blade thickness position 3 and the rear edge 4 on the back side has design flexibility.

(2) Relationship Between Aerodynamic Noise and Boundary Layer Thickness (Displacement Thickness)

A main factor of aerodynamic noise is the vortex in the boundary layer discharged from the turbulence boundary layer near the rear edge 4 on the blade back side. Thus, reducing the thickness of the turbulence boundary layer reduces aerodynamic noise.

(3) Relationship Between Boundary Layer Thickness (Displacement Thickness) and Blade Surface Flow Velocity Generally, the boundary layer thickness more easily develops with a higher blade surface flow velocity (=flow velocity at an outer edge of the boundary layer=main flow velocity; u) and a higher reduction ratio (=tilt(−du/dx)) of the blade surface flow velocity.

Thus, to relieve development of the boundary layer and reduce aerodynamic noise, it is effective to reduce the blade surface flow velocity u and reduce the reduction ratio (−du/dx) of the blade surface flow velocity. In particular, on the blade back surface, the boundary layer easily develops in the second region 12 (see FIG. 4) that is a region behind the position X/C=0.5 in the blade chord direction with turbulence transition of the boundary layer, and thus blade surface flow velocity distribution indicated by a solid line in FIG. 6(a) is desirable.

(4) Relationship Between Blade Surface Flow Velocity and Blade Profile Shape

The blade back shape and the blade surface flow velocity have a hydrodynamic relationship of "accelerating on a protruding surface and decelerating on a recessed surface". Mathematically expressed, a flow velocity tends to increase with increasing $d^2Y/dX^2$ (tilt of dY/dX), and decrease with decreasing $d^2Y/dX^2$. For distributing the flow velocity as indicated by the solid line in FIG. 6(a), it is effective to reduce $d^2Y/dX^2$ (tilt of dY/dX) in the second region 12 as shown in FIG. 6(b).

With the conditions (i) to (iii) described above, the second region 12 and the maximum blade thickness position 3, as well as the second region 12 and the rear edge 4 are connected as indicated by a broken line in FIG. 6(b), and thus the dY/dX curve draws a substantially S shape.

Specifically, the blade profile shape is defined as below.

TABLE 2

| X/C | Y/C | dY/dX |
|---|---|---|
| 0.3000 | 0.1157 | |
| 0.3500 | 0.1149 | −0.05300 |
| 0.4000 | 0.1111 | −0.10420 |
| 0.4500 | 0.1051 | −0.14060 |
| 0.5000 | 0.0976 | −0.16200 |
| 0.5500 | 0.0892 | −0.17410 |
| 0.6000 | 0.0803 | −0.18150 |
| 0.6500 | 0.0712 | −0.18580 |
| 0.7000 | 0.0618 | −0.18840 |
| 0.7500 | 0.0523 | −0.19110 |
| 0.8000 | 0.0427 | −0.19530 |
| 0.8500 | 0.0328 | −0.20100 |
| 0.9000 | 0.0226 | −0.20850 |
| 0.9500 | 0.0120 | −0.21830 |
| 1.0000 | 0.0007 | |

An error range of ±3% of each numerical value of Y/C is allowed.

Figure 6:
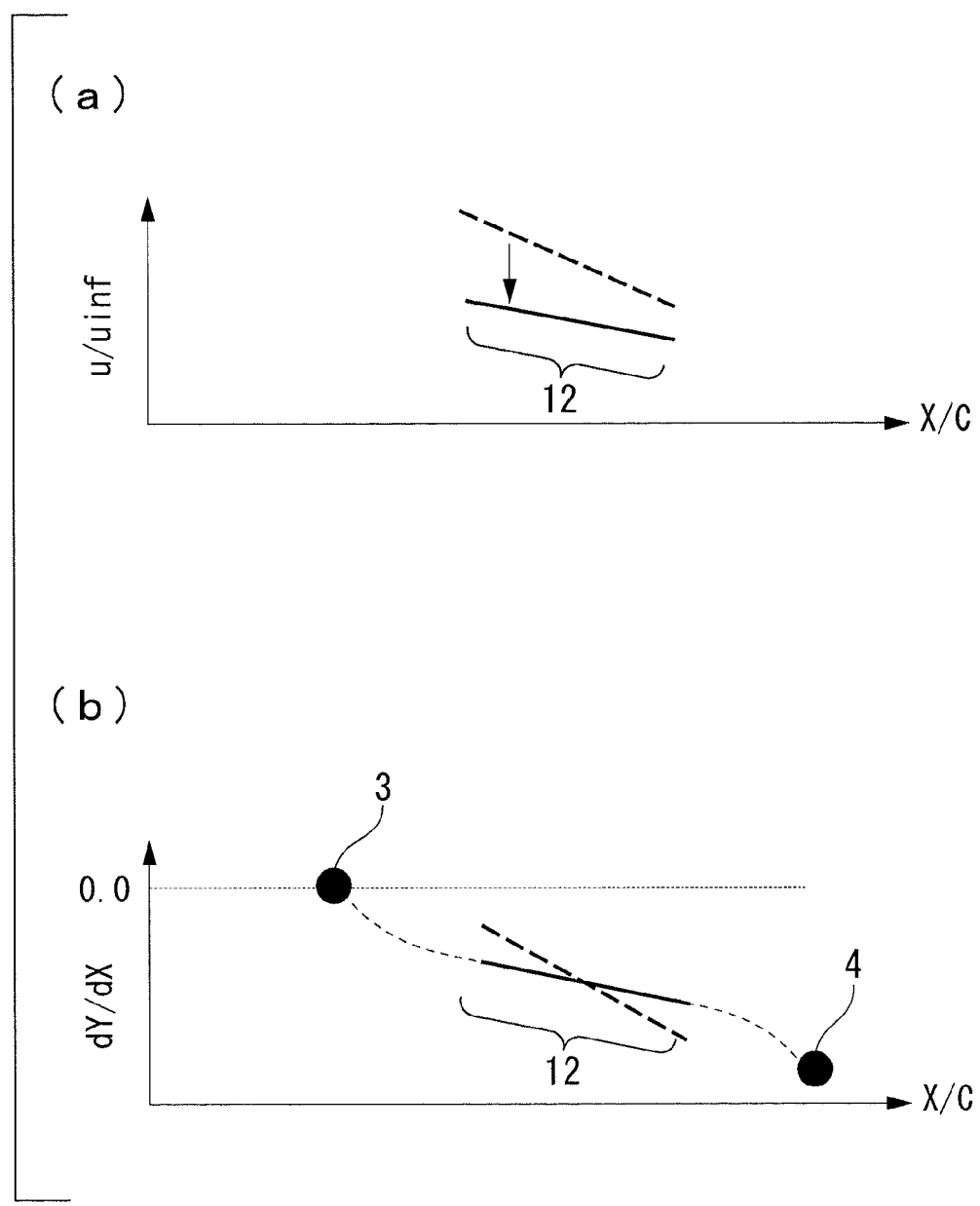
FIG. 6 illustrates a design concept of a blade profile in FIG. 4.
Figure 7:
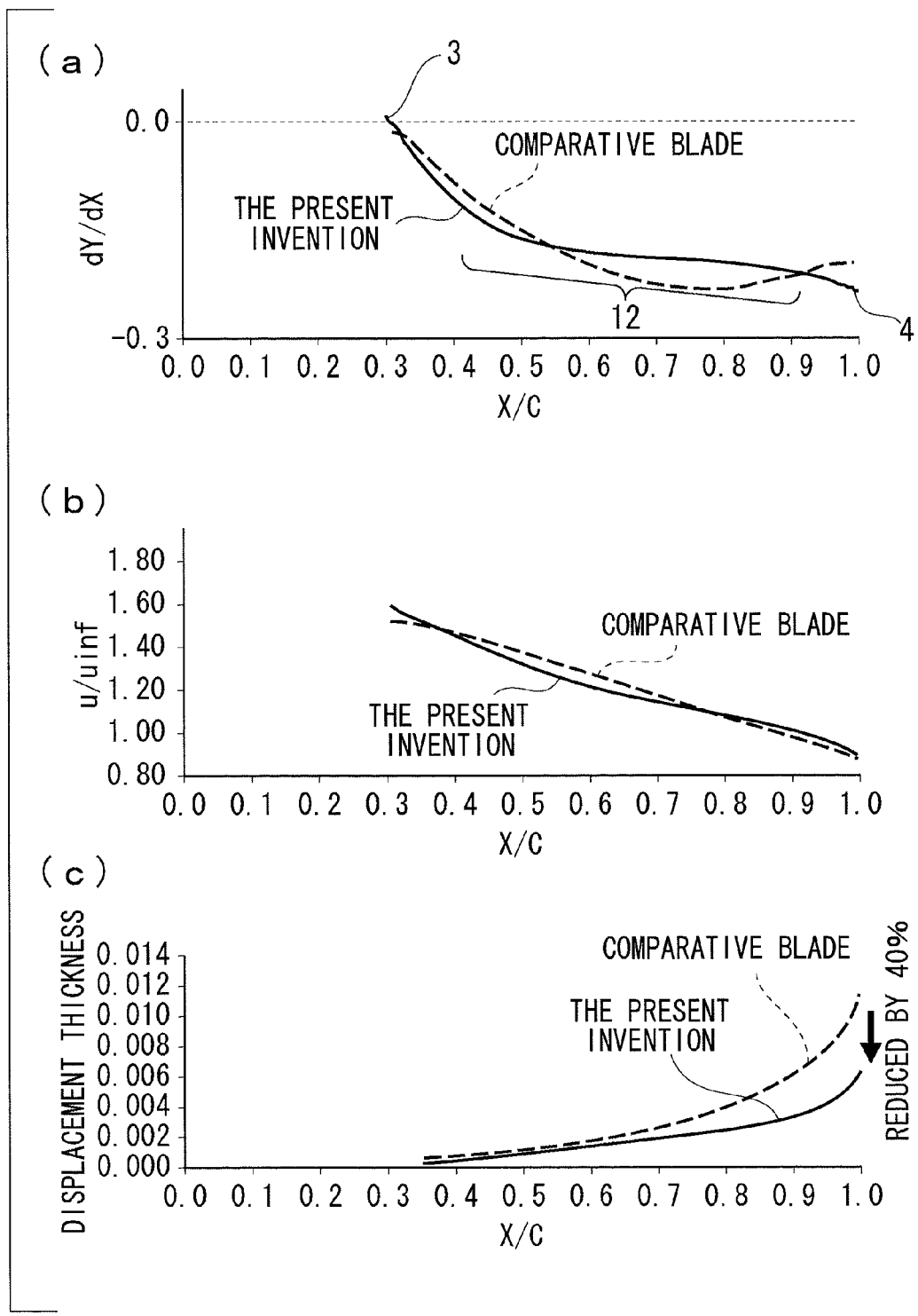
FIG. 7 is a graph showing an advantage of the blade profile in FIG. 4.
Figure 8:
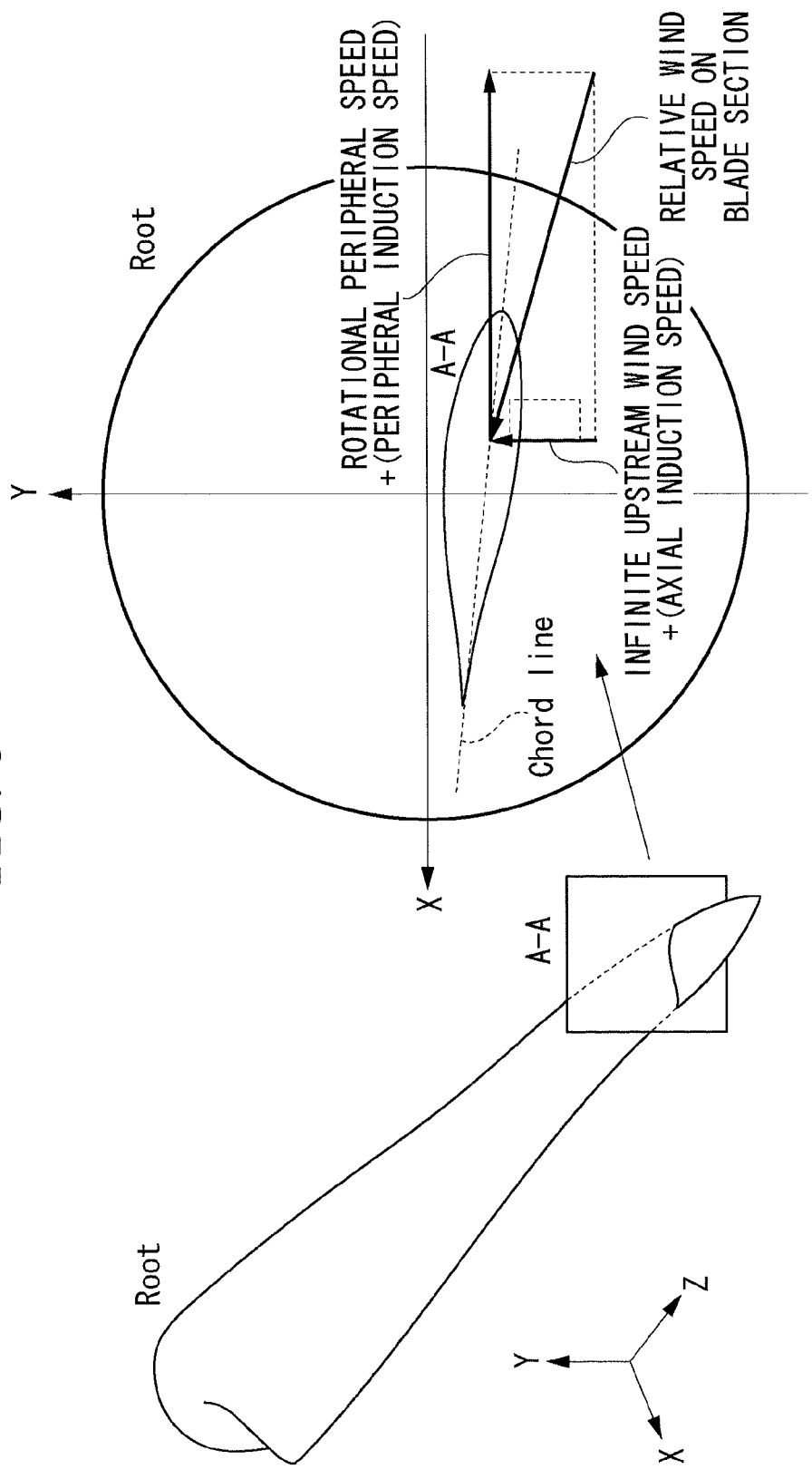
FIG. 8 illustrates definition of Reynolds number.

Thus, determining distribution of dY/dX as in the above table under the design concept illustrated in FIG. 6 provides an advantage as shown in FIG. 7.

Specifically, as shown in FIG. 7(a), unlike a comparative blade compared at the same angle of attack, a substantially horizontal second region 12 is provided, and thus as shown in FIG. 7(b), a blade surface flow velocity on the second region 12 is reduced to reduce by 40% a turbulence boundary layer thickness (displacement thickness) at the rear edge 4 as shown in FIG. 7(c). Thus, aerodynamic noise is reduced by 2 dB as compared to the comparative example.

REFERENCE SIGNS LIST 1 wind turbine blade
1a blade root
1b blade tip
3 maximum blade thickness position
4 rear edge
11 first region
12 second region
13 third region

The invention claimed is:

1. A wind turbine blade in which a blade back shape from a maximum blade thickness position toward a rear edge is defined so that
when a distance from a front edge along a blade chord line is represented by X and a distance from the blade chord line to a blade back side is represented by Y,
the blade back shape includes
a first region that extends from the maximum blade thickness position toward the rear edge on the blade back side with dY/dX as a primary derivative amount of the Y to the X decreasing by a first amount of change,
a second region that is located on a side of the rear edge of the first region and extends toward the rear edge with the dY/dX having a second amount of change smaller than the first amount of change, and
a third region that is located on the side of the rear edge of the second region and is connected to the rear edge with the dY/dX decreasing by a third amount of change larger than the second amount of change.

2. The wind turbine blade according to claim 1, wherein when the X is divided by a chord length and normalized with the X in a front edge being 0% and the X in a rear edge being 100%, the maximum blade thickness position is provided within a range of the X of 29% to 31%.

3. The wind turbine blade according to claim 1, wherein when the X is divided by a chord length and normalized with the X in the front edge being 0% and the X in the rear edge being 100%, a maximum camber position is provided within a range of the X of 50% to 65%.

4. The wind turbine blade according to claim 1, further comprising a blade body that extends radially from a blade root toward a blade tip and has a maximum blade thickness changing in each radial position,
wherein a blade shape in a section of the blade body in each radial position has the dY/dX increased and decreased depending on an increase and a decrease in the maximum blade thickness in each section.

5. The wind turbine blade according to claim 1, further comprising a blade body that extends radially from a blade root toward a blade tip and has a maximum blade thickness position changing in each radial position,
wherein a blade shape in a section of the blade body in each radial position has the X changed depending on a change in the maximum blade thickness position in each section.

6. The wind turbine blade according to claim 1, wherein with a chord length being C in a blade section, X/C, Y/C, and the dY/dX are defined as in Table 1,

TABLE 1

| X/C | Y/C | dY/dX |
|---|---|---|
| 0.3000 | 0.1157 | |
| 0.3500 | 0.1149 | −0.05300 |
| 0.4000 | 0.1111 | −0.10420 |
| 0.4500 | 0.1051 | −0.14060 |
| 0.5000 | 0.0976 | −0.16200 |
| 0.5500 | 0.0892 | −0.17410 |
| 0.6000 | 0.0803 | −0.18150 |
| 0.6500 | 0.0712 | −0.18580 |
| 0.7000 | 0.0618 | −0.18840 |
| 0.7500 | 0.0523 | −0.19110 |
| 0.8000 | 0.0427 | −0.19530 |
| 0.8500 | 0.0328 | −0.20100 |
| 0.9000 | 0.0226 | −0 20850 |
| 0.9500 | 0.0120 | −0.21830 |
| 1.0000 | 0.0007 | | and the wind turbine blade has a blade shape within an error range of ±3% of each numerical value of the Y/C.

7. A wind turbine generator comprising:
a wind turbine blade according to claim 1;
a rotor that is connected to a side of a blade root of the wind turbine blade and rotated by the wind turbine blade; and
a generator that converts torque obtained by the rotor into electrical output power.

8. A method for designing a wind turbine blade comprising:
defining a blade back shape from a maximum blade thickness position toward a rear edge so that
when a distance from a front edge along a blade chord line is represented by X and a distance from the blade chord line to a blade back side is represented by Y,
the blade back shape includes
a first region that extends from the maximum blade thickness position toward the rear edge on the blade back side with dY/dX as a primary derivative amount of the Y to the X decreasing by a first amount of change,
a second region that is located on a side of the rear edge of the first region and extends toward the rear edge with the dY/dX having a second amount of change smaller than the first amount of change, and a third region that is located on the side of the rear edge of the second region and is connected to the rear edge with the dY/dX decreasing by a third amount of change larger than the second amount of change.

9. The method for designing a wind turbine blade according to claim 8, further comprising:

a reference blade shape determination step of determining a reference blade shape as a reference by the method for designing a wind turbine blade; and a second blade shape determination step of determining, when determining a second blade shape having a maximum blade thickness different from a maximum blade thickness of the reference blade shape determined by the reference blade shape determination step, the second blade shape by increasing or decreasing the dY/dX depending on an increase and a decrease in the maximum blade thickness with respect to the maximum blade thickness of the reference blade shape.

10. The method for designing a wind turbine blade according to claim 8 comprising:

a reference blade shape determination step of determining a reference blade shape as a reference by the method for designing a wind turbine blade; and a third blade shape determination step of determining, when determining a third blade shape having a maximum blade thickness position different from a maximum blade thickness position of the reference blade shape determined by the reference blade shape determination step, the third blade shape by changing the X depending on a change in the maximum blade thickness position with respect to the maximum blade thickness position of the reference blade shape.

\* \* \* \* \*